(12) United States Patent
Stopler

(10) Patent No.: US 9,596,439 B2
(45) Date of Patent: Mar. 14, 2017

(54) CIRCUIT, DEVICE, METHOD AND SYSTEM FOR TRANSMITTING VIDEO DATA BETWEEN A VIDEO SOURCE AND A VIDEO SINK

(75) Inventor: Daniel Stopler, Holon (IL)

(73) Assignee: Amimon Ltd., Ra'anana (IL)

( * ) Notice: Subject to any disclaimer, the term of this patent is extended or adjusted under 35 U.S.C. 154(b) by 1007 days.

(21) Appl. No.: 13/521,225

(22) PCT Filed: Jan. 18, 2011

(86) PCT No.: PCT/IB2011/050207
§ 371 (c)(1),
(2), (4) Date: Jun. 17, 2013

(87) PCT Pub. No.: WO2011/089546
PCT Pub. Date: Jul. 28, 2011

(65) Prior Publication Data
US 2013/0259140 A1 Oct. 3, 2013

Related U.S. Application Data

(60) Provisional application No. 61/282,301, filed on Jan. 19, 2010.

(51) Int. Cl.
*H04N 7/26* (2006.01)
*H04N 19/10* (2014.01)
(Continued)

(52) U.S. Cl.
CPC ....... *H04N 7/26005* (2013.01); *H04L 1/0057* (2013.01); *H04L 27/2626* (2013.01);
(Continued)

(58) Field of Classification Search
USPC .......................................... 375/240
See application file for complete search history.

(56) References Cited

U.S. PATENT DOCUMENTS 4,791,483 A * 12/1988 Miller .................. H04N 11/046
375/240.01
6,229,854 B1 5/2001 Kikuchi et al.
(Continued)

OTHER PUBLICATIONS

International Search Report for application PCT/IB2011/050207 dated Jun. 21, 2011.

*Primary Examiner* — Kate Luo
(74) *Attorney, Agent, or Firm* — Eitan, Mehulal & Sadot

(57) ABSTRACT

A method, circuit and system for transmission, receiving and processing of video data between a video source transceiver and a video sink transceiver. Video data or information to be transmitted, which instructs an image processor associated with a video sink to modify a previously video frame into a current frame. A Delta Frame may include one or more Grid Based Predicted Error ("GBPE") Values. The GBPE may be generated by source-side image processing logic using processes or techniques similar to those described in the MPEG and/or H.264 Standards, with the exception that the prediction error values may be calculated relative to a noisy predicted frame (e.g. based on an analog reception of a base frame) which has been grid quantized based on video sink transceiver SNR (e.g. substantially each pixel value in the predicted frame is rounded off up or down to a value on some grid).

19 Claims, 5 Drawing Sheets

(51) Int. Cl.
*H04L 1/00* (2006.01)
*H04L 27/26* (2006.01)
*H04L 5/00* (2006.01)

(52) U.S. Cl.
CPC ......... *H04L 27/2647* (2013.01); *H04N 19/10* (2014.11); *H04L 1/0059* (2013.01); *H04L 5/0044* (2013.01)

(56) References Cited

U.S. PATENT DOCUMENTS

| | | |
|---|---|---|
| 7,231,587 B2 * | 6/2007 | Novotny et al. .............. 714/807 |
| 2005/0207346 A1 | 9/2005 | Chu et al. |
| 2006/0013314 A1 | 1/2006 | Vella et al. |
| 2006/0206775 A1 | 9/2006 | Bhaskaran et al. |
| 2007/0098063 A1 * | 5/2007 | Reznic ................... H04N 19/60 375/240.2 |
| 2007/0110327 A1 * | 5/2007 | Han ..................... H04N 19/115 382/251 |
| 2007/0206673 A1 * | 9/2007 | Cipolli et al. ............. 375/240.1 |
| 2007/0286188 A1 | 12/2007 | Fan et al. |
| 2008/0304602 A1 | 12/2008 | Kim et al. |
| 2009/0213940 A1 * | 8/2009 | Steinbach ............ H04N 19/176 375/240.27 |

\* cited by examiner

CIRCUIT, DEVICE, METHOD AND SYSTEM FOR TRANSMITTING VIDEO DATA BETWEEN A VIDEO SOURCE AND A VIDEO SINK

CROSS-REFERENCE TO RELATED APPLICATIONS

The present application is a US National Phase of PCT Application No. PCT/IB2011/050207, filed on Jan. 18, 2011, which claims the benefit U.S. Provisional Application No. 61/282,301 filed Jan. 19, 2010, the disclosures of which are incorporated herein by reference.

FIELD OF THE INVENTION

Some embodiments relate generally to the field of wireless communication and, more particularly, to a circuit, device, method and system for transmitting video data between a video source and a video sink, wherein transmitted correction data is derived based on a video source estimate of a noisy signal received by the video sink.

BACKGROUND

Wireless communication has rapidly evolved over the past decades. Even today, when high performance and high bandwidth wireless communication equipment is made available there is demand for even higher performance at a higher data rates, which may be required by more demanding applications.

Video signals may be generated by various video sources, for example, a computer, a game console, a Video Cassette Recorder (VCR), a Digital-Versatile-Disc (DVD), a Blu-ray (BR) disk player, or any other suitable video source. In many houses, for example, video signals are received through cable or satellite links at a Set-Top Box (STB) located at a fixed point.

In many cases, it may be desired to place a screen or projector at a location in a distance of at least a few meters from the video source. This trend is becoming more common as flat-screen displays, e.g., plasma or Liquid Crystal Display (LCD) televisions are hung on a wall. Connection of such a display or projector to the video source through cables is generally undesired for aesthetic reasons and/or installation convenience. Thus, wireless transmission of the video signals from the video source to the screen is preferred.

WHDI—Wireless Home Digital Interface is a new standard for wireless high-definition video connectivity between a video source (e.g. cable box) and video sink (e.g. display). It provides a high-quality, uncompressed wireless link which can support delivery of equivalent video data rates of up to 3 Gbit/s (including uncompressed 1080p) in a 40 MHz channel within the 5 GHz unlicensed band. Equivalent video data rates of up to 1.5 Gbit/s (including uncompressed 1080i and 720p) can be delivered on a single 20 MHz channel in the 5 GHz unlicensed band, conforming to worldwide 5 GHz spectrum regulations. Range is beyond 100 feet (30 m), through walls, and latency is less than one millisecond.

The WHDI standard is partially based on transmission of uncompressed video, such that each video frame is transmitted as a complete renderable video frame data set. In order to achieve the high data rates required for such transmission, WHDI utilizes analog (non-discrete) transmission symbol encoding and decoding. To date, such analog transmission encoding/decoding has not been suitable for transmission of compressed video such as MPEG and H.264 compliant video streams due to the possibility and outcome (i.e. poor corrupted image quality) of transmission/reception error propagation and accumulation between Base Frames of the video stream.

There is thus a need in the field of wireless communication for improved devices, methods and systems for transmitting video data between a video source transceiver and a video sink transceiver.

SUMMARY OF THE INVENTION

The present invention is a method, circuit and system for transmission of video data between a video source transceiver and a video sink transceiver. The present invention is also a method, circuit and system for receiving and processing of video data or information from a video source at a video sink transceiver. According to some embodiments of the present invention, video data or information to be transmitted may be in the form of: (1) a complete frame data set (also referred to as a Base frame), or (2) one or more image transform instructions or parameters (also referred to as a Delta Frame) which instructs an image processor associated with a video sink to modify a previously received/constructed/rendered video frame into a current frame. A Delta Frame according to some embodiments of the present invention may include one or more Grid Based Predicted Error ("GBPE") Values. The GBPE may be generated by source-side image processing logic, at or near the video source, using processes or techniques similar to those described in the MPEG and/or H.264 Standards, with the exception that the prediction error values may be calculated relative to a noisy predicted frame (e.g. based on an analog reception of a base frame) which has been grid quantized based on video sink transceiver SNR (e.g. substantially each pixel value in the predicted frame is rounded off up or down to a value on some grid).

According to further embodiments of the present invention, given GBPE values received at a video sink may be used to generate a complete viewable frame by modifying a sink side generated noisy predicted frame roughly corresponding to the source side predicted frame from which the given GBPE values were generated. The corresponding sink side predicted frame may also be grid quantized using a sink side grid with a value-order or value-structure corresponding to that of the source side grid used to quantize the source side predicted frame from which the given GBPE values were originally calculated.

According to some embodiments of the present invention, there may be provided a video source transmitter (optionally a wireless video source) adapted to transmit over a first communication link (e.g. radio frequency communication link) to a video sink receiver data associated with each of one or more video frames, wherein the data associated with the one or more video frames may either be: (1) stored on a data storage medium and/or device (e.g. CD, DVD, NVM, etc.) functionally associated with the video source, or (2) received by the video source over a second communication link (e.g. I.P.T.V., satellite cable, etc.). According to some embodiments of the present invention, the video source transmitter may be adapted to transmit video frame related data using analog based transmission encoding, one example of which is described in U.S. patent application Ser. No. 11/551,641.

The data associated with the one or more video frames to be transmitted by a video source transceiver according to some embodiments of the present invention may be stored on or received by the video source transceiver as either: (1) complete frame data sets, such that a data set stored/received for each frame may be rendered into a complete viewable frame without reference to data associated with any other frame (e.g. Base Frames according to the MPEG/H.264 standards); or (2) as a combination of (a) complete renderable frame data sets, between which there may be sets of (b) video frame modification instructions/parameters (e.g. Delta Frame according the MPEG/H.264 standards), such that each set of frame modification instructions/parameters may be associated with a current frame and may be usable to generate a complete/renderable current frame data set (i.e. complete frame data set) by modifying either a previous complete frame data set, a subsequent complete frame data set and/or a previous frame that was corrected using a delta frame. The frame modification instructions/parameters for a given frame may include: (1) a combination of motion vectors adapted to modify portions of a previous/subsequent complete frame data set into a predicted frame associated with the given frame, and (2) prediction error values usable to adjust, tune or correct the predicted frame into a complete renderable frame data set. It should be understood that the phrase "previous complete frame data set" may refer to either a frame data set received/stored as a complete frame data set or to a frame data set which was generated by the application of frame modification instructions/parameters associated with the "previous frame" onto a complete frame data set of an even earlier frame—which even earlier frame may have been generated using frame modification instructions/parameters. According to further embodiments, with regard to frame modification instructions/parameters (e.g. Delta Frames), instead of, or conjunction with, generating and/or transmitting conventional prediction error values (as described in the MPEG/H.264 standards) Grid Based Predicted Error ("GBPE") Values may be generated and/or transmitted.

According to some embodiments, a video source transceiver may generate GBPE values to be transmitted as part of a "current frame" set of instructions/parameters (e.g. Delta Frame) intended to convert a complete previous frame data set into a complete "current frame" data set). The GBPE values for the current frame may be generated by (1) applying motion prediction vectors associated with the current frame to a complete frame data set of a previous frame in order to generate a predicted frame for the current frame, (2) grid quantizing the predicted frame to generate a grid quantized version of the predicted frame, and (3) subtracting the grid quantized version of the predicted frame from the complete frame data set associated with the current frame in order to calculate the GBPE. According to embodiments of the present invention where the current frame is stored/transceived by the video source transceiver as a complete video frame data set, motion prediction vectors for the current frame may need to be generated by comparing the complete frame data set of the current frame with a complete frame data set of the previous frame. According to embodiments of the present invention where the current frame is stored/received by the video source transceiver as a set of frame modification instructions/parameters (e.g. Delta Frame), generation of a complete frame data set for the current and possibly previous frames may also be required. It should be understood that a video source transceiver according to embodiments of the present invention may include one or more video data buffers to temporarily store all of the above mentioned data sets, vectors and parameters. A dedicated or general purpose processor functionally associated with the video source transceiver may perform any of the above mentioned operations.

According to some embodiments, a grid quantization of a predicted frame may refer to rounding off substantially each pixel value in a predicted frame to a value of a set or grid of discrete point values. The set or grid of discrete values may be the same for each predicted frame or may be adaptively generated. According to some embodiments of the present invention relating to adaptively generated grids, spacing between values on a grid may be inversely related to the signal to noise (S/N) ratio of the video source transceiver's signal received at a target video sink transceiver.

According to some embodiments, there may be provided a video sink transceiver including video processing logic adapted to generate a complete frame data set for a given frame using received GBPE values associated with the given frame. According to some embodiments, the video sink transceiver may receive from a corresponding video source transceiver frame modification instructions/parameters (e.g. Delta Frame) for the given frame, which frame modification instructions/parameters (e.g. Delta Frame) may include one or more motion prediction vectors and GBPE values for the given frame. The received motion prediction vectors may be used by a processing logic to adjust, convert or transform a previous complete frame data set into a prediction frame of the given frame. The GBPE values may be applied (i.e. added or subtracted) to the predicted frame in order to generate a complete frame data set for the given frame. According to some embodiments of the present invention, the predicted frame may first be grid quantized prior to the application of the GBPE values. The grid used for quantization may be substantially identical to a grid used to the generate the GBPE values. According to further embodiments of the present invention, the processing logic may derive the grid used for quantizing the predicted frame based on the frame information received from the video source transceiver.

According to further embodiments of the present invention, a first step of quantization may be the receiver subtracting a delta frame from a non-quantized predicted frame (i.e. a frame that was predicted using motion vectors). The resulting difference may be quantized. According to further embodiments of the present invention, in order to minimize the probability of quantization errors, the video source transceiver may also send digital redundancy that protects the quantization. According to further embodiments of the present invention, the redundancy can be used in conjunction with the non-quantized version of the resulting difference in order to decode the quantized values (i.e. to find the quantized values that are closest to resulting difference but also have the required redundancy).

According to some embodiments of the present invention when used in error prone channels (e.g. wireless channels), transmitted data may gracefully degrade when small noise is inflicted on GBPE fine values. When noise is large enough to cause predicted frame quantization errors, a reference frame may get corrupted, possibly causing error propagation. According to further embodiments of the present invention, to avoid error propagation the source may add some additional redundancy on the quantized data. The sink may use this redundancy to identify decoding failures. When a decoding failure is identified, the sink may ask the source to use a prior reference frame instead of the erroneously received reference frame, thus avoiding error propagation. According to further embodiments of the present invention, the sink may ask the source to reduce the digital data transmission rate and to increase fine data robustness by increasing the grid step size. The reduction of digital data transmission rate may reduce the probability of bit errors. The increase of the grid step size may reduce the probability of predicted frame quantization errors.

It should be understood that video data, as described herein, may also include and/or refer to audio data. Thus, video data based logic, circuits, modules, and signals, may also include and/or refer to audio data based logic, circuits, modules, and signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
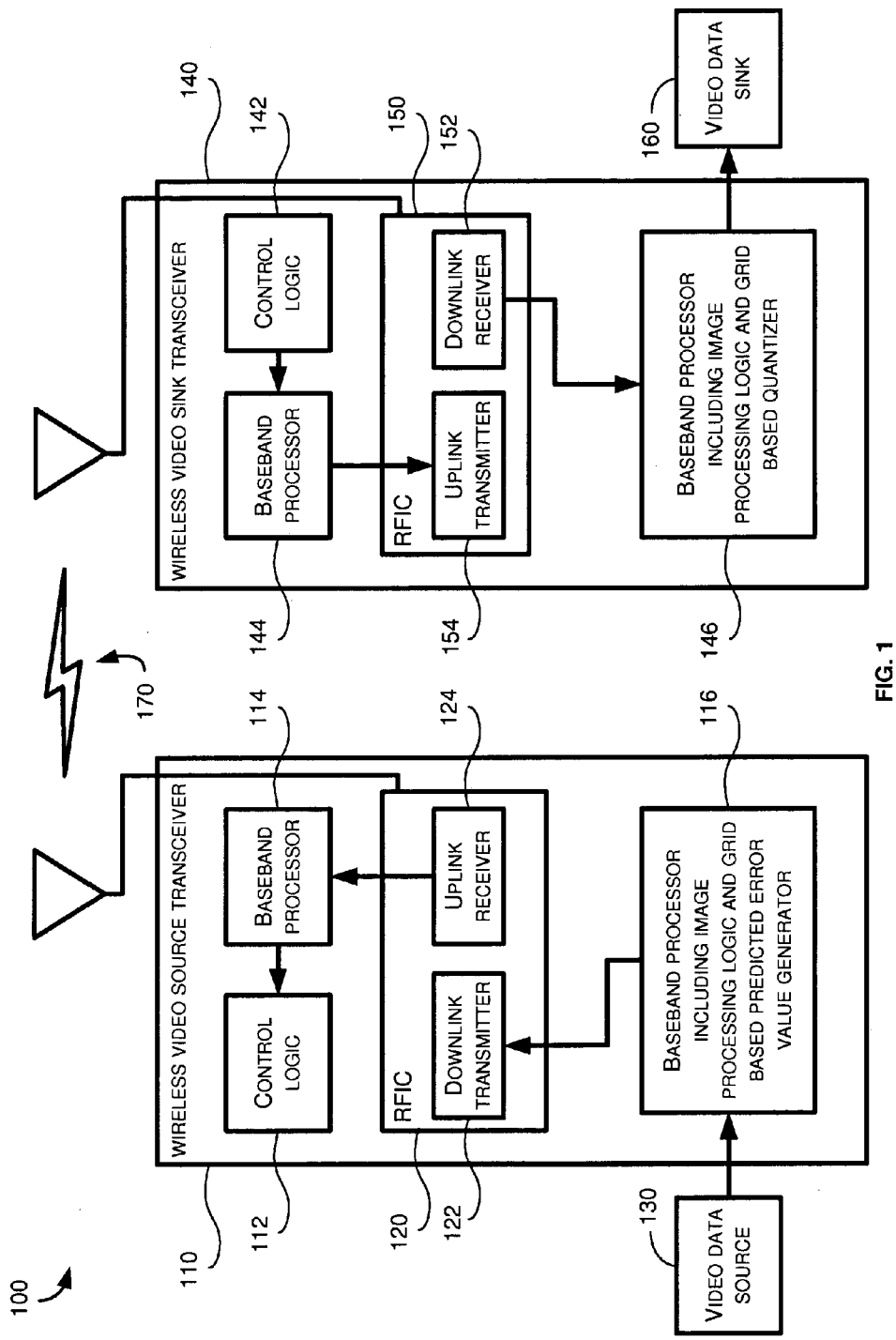
FIG. 1 is a functional block diagram of an exemplary video source transceiver and video sink transceiver arrangement according to some embodiments of the present invention where the video source transceiver includes a video transmission circuit and the video sink transceiver includes a video reception circuit.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications, commercial applications, or any other suitable application. In some demonstrative embodiments the methods, devices and/or systems disclosed herein may be used in the field of consumer electronics, for example, as part of any suitable television, video Accessories, Digital-Versatile-Disc (DVD), multimedia projectors, Audio and/or Video (A/V) receivers/transmitters, gaming consoles, video cameras, video recorders, portable media players, cell phones, mobile devices, and/or automobile A/V accessories. In some demonstrative embodiments the methods, devices and/or systems disclosed herein may be used in the field of Personal Computers (PC), for example, as part of any suitable desktop PC, notebook PC, monitor, and/or PC accessories. In some demonstrative embodiments the methods, devices and/or systems disclosed herein may be used in the field of professional A/V, for example, as part of any suitable camera, video camera, and/or A/V accessories. In some demonstrative embodiments the methods, devices and/or systems disclosed herein may be used in the medical field, for example, as part of any suitable endoscopy device and/or system, medical video monitor, and/or medical accessories. In some demonstrative embodiments the methods, devices and/or systems disclosed herein may be used in the field of security and/or surveillance, for example, as part of any suitable security camera, and/or surveillance equipment. In some demonstrative embodiments the methods, devices and/or systems disclosed herein may be used in the fields of military, defense, digital signage, commercial displays, retail accessories, and/or any other suitable field or application.

The invention can be used either for signal communication purposes or for signal storage purposes. For communication purposes, it helps prevent errors due to channel noise, while for storage purposes it helps prevent errors due to storage media distortions.

Although embodiments of the invention are not limited in this respect, one or more of the methods, devices and/or systems disclosed herein may be used to wirelessly transmit video signals, for example, High-Definition-Television (HDTV) signals, between at least one video source and at least one video destination. In other embodiments, the methods, devices and/or systems disclosed herein may be used to transmit, in addition to or instead of the video signals, any other suitable signals, for example, any suitable multimedia signals, e.g., audio signals, between any suitable multimedia source and/or destination.

Although some demonstrative embodiments are described herein with relation to wireless communication including video information, some embodiments may be implemented to perform wireless communication of any other suitable information, for example, multimedia information, e.g., audio information, in addition to or instead of the video information. Some embodiments may include, for example, a method, device and/or system of performing wireless communication of A/V information, e.g., including audio and/or video information. Accordingly, one or more of the devices, systems and/or methods described herein with relation to video information may be adapted to perform wireless communication of A/V information.

Some demonstrative embodiments may be implemented to communicate wireless-video signals over a wireless-video communication link, as well as Wireless-Local-Area-Network (WLAN) signals over a WLAN link. Such implementation may allow a user, for example, to play a movie, e.g., on a laptop computer, and to wirelessly transmit video signals corresponding to the movie to a video destination, e.g., a screen, while maintaining a WLAN connection, e.g., with the Internet and/or one or more other devices connected to a WLAN network. In one example, video information corresponding to the movie may be received over the WLAN network, e.g., from the Internet.

According to some embodiments of the present invention, there may include a method of communicating video information from a video source transceiver to a video sink transceiver using analog source coding and at the source deriving frame prediction error values for a given frame by quantizing a predicted frame of the given frame to a grid. According to further embodiments of the present invention, the method may include adding redundancy to the grid based data at the source and using the redundancy to decode the grid based data at the sink. According to further embodiments of the present invention, the method may include adding a cyclic redundancy check (CRC) to the grid based data at the source and using the CRC at the sink to determine if the grid quantization was successful. According to further embodiments of the present invention, the method may include applying concealment at the sink, informing the source to use a stored reference frame, informing the source to lower a digital data coding rate and/or informing the source to increase a step size of the grid when it is determined that grid quantization was not successful.

According to some embodiments of the present invention, the method may include receiving the frame prediction error values at the sink and generating the grid decisions based on the received prediction error values and a predicted frame. According to further embodiments of the present invention, the method may include predicting the predicted frame from a previous frame. According to further embodiments of the present invention, the method may comprise generating a complete frame data set by adding the received prediction error values onto the grid quantized decisions of the predicted frame. According to further embodiments of the present invention, the method includes a grid spacing of the grid that is inversely related to a signal to noise ratio (SNR) detected at the sink.

According to some embodiments of the present invention, there includes a video source transceiver comprising processing logic adapted to derive frame prediction error values for a given frame by quantizing a predicted frame of the given frame to a grid and a transmitter adapted to transmit the derived prediction error values to a corresponding video sink transceiver. According to further embodiments of the present invention, the processing logic may be further adapted to add redundancy to the grid based data. According to further embodiments of the present invention, the processing logic may be further adapted to add a cyclic redundancy check (CRC) to the grid based data. According to further embodiments of the present invention, the grid spacing of the grid may be inversely related to a signal to noise ratio (SNR) detected at the sink.

According to some embodiments of the present invention, there includes a video sink transceiver comprising a receiver adapted to receive Grid Based Error Prediction ("GBPE") values associated with grid based data from a functionally associated source. According to further embodiments of the present invention, the transceiver may be further adapted to receive redundancy values and use the redundancy values to decode the grid based data. According to further embodiments of the present invention, the transceiver may be further adapted to receive a cyclic redundancy check (CRC) and use the CRC to determine if the grid quantization of the grid based data was successful. According to further embodiments of the present invention, the transceiver may be further adapted to apply concealment, inform the source to use a stored reference frame, inform the source to lower a digital data coding rate and/or inform the source to increase a step size of the grid when it is determined that grid quantization of the grid based data was not successful.

According to some embodiments of the present invention, the transceiver may be further adapted to generate grid decisions based on the received GBPE values and a predicted frame. According to further embodiments of the present invention, the predicted frame may be predicted from a previous frame. According to further embodiments of the present invention, the transceiver may be further adapted to generate a complete frame data set by adding the received GBPE values onto the grid quantized decisions of the predicted frame.

Now turning to FIG. 1, there is shown a functional block diagram of an exemplary video source transceiver and video sink transceiver arrangement (100) according to some embodiments of the present invention where the video source transceiver includes a video transmission circuit and the video sink transceiver includes a video reception circuit.

According to some embodiments of the present invention a wireless video source transceiver (110) may include a radio-frequency integrated chip (RFIC) (120) to transmit and receive data signals along a functionally associated antenna. According to further embodiments of the present invention, the RFIC may include a downlink transmitter (122) for transmitting downlink data signals and an uplink receiver (124) for receiving uplink data signals.

According to some embodiments of the present invention, the wireless video source transceiver (110) may include a baseband processor (114) to process control signals received via the uplink receiver (124) and send the data to a functionally associated control circuit and/or processor (112). According to some embodiments of the present invention, the wireless video source transceiver (110) may include a baseband processor including image processing logic and grid based prediction error value generator (116) to take incoming video data signals from a functionally associated video data source (130) and process the data for downlink transmission, via the downlink transmitter (122), to a functionally associated wireless video sink transceiver (140).

According to some embodiments of the present invention, a wireless video sink transceiver (140) may include a RFIC chip (150) to transmit and receive data signals along a functionally associated antenna. According to further embodiments of the present invention, the RFIC may include a downlink receiver (152) for receiving downlink data signals and an uplink transmitter (154) for transmitting uplink data signals.

According to some embodiments of the present invention, the wireless video sink transceiver (140) may include a baseband processor (144) to process control data received from a functionally associated control circuit and/or processor (142) and send the control data to the uplink transmitter (154). According to some embodiments of the present invention, the wireless video sink transceiver (140) may include a baseband processor including image processing logic and grid based quantizer (146) to take video data signals received, via the downlink receiver (152), from a functionally associated wireless video source transceiver (110) and process the data for a functionally associated video data sink (160).

Figure 2:
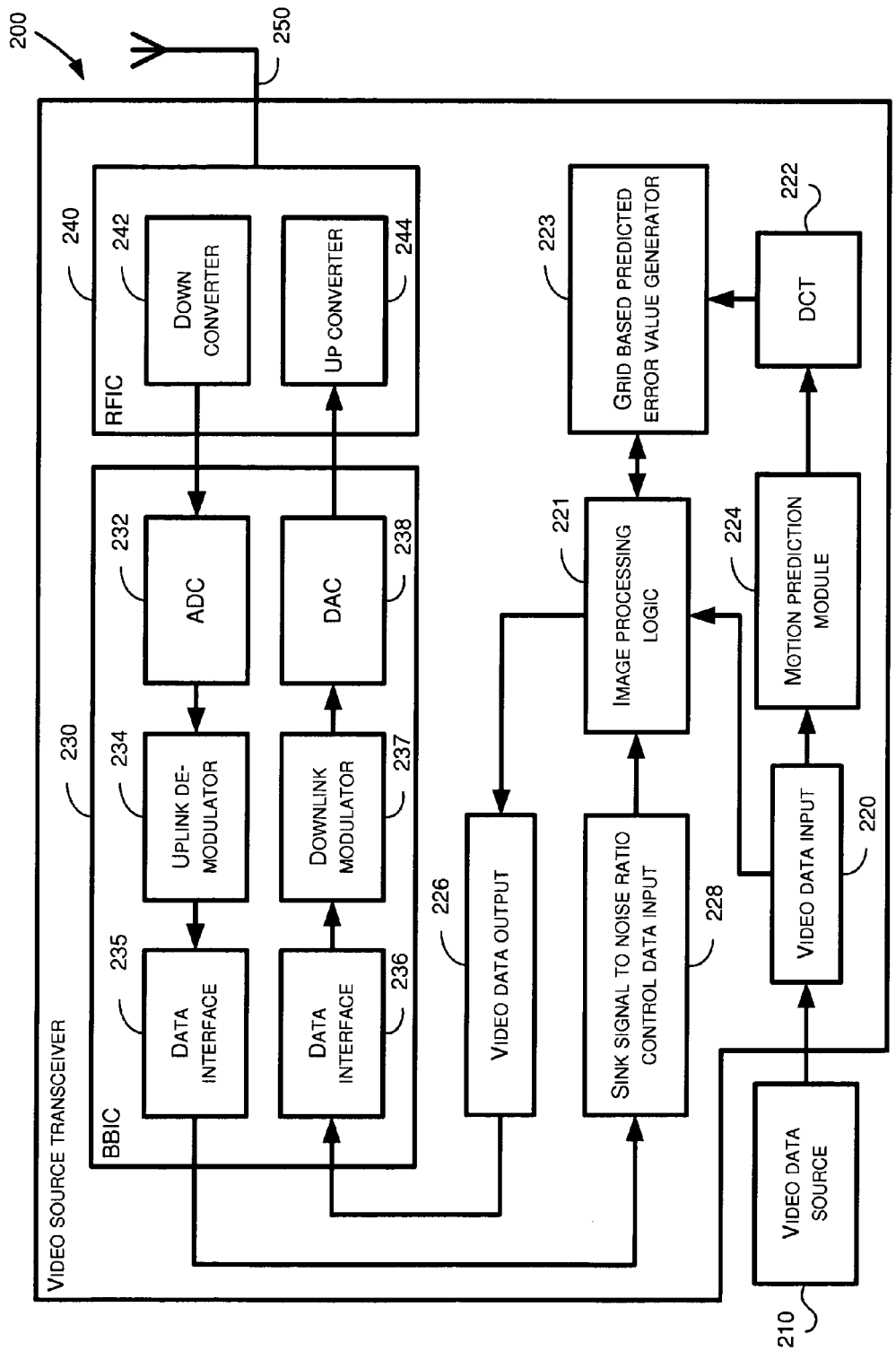
FIG. 2 is a functional block diagram of an exemplary video source transceiver according to some embodiments of the present invention where the source transceiver includes image processing components.

Now turning to FIG. 2, there is shown a functional block diagram of an exemplary video source transceiver according to some embodiments of the present invention where the source transceiver includes image processing components.

According to some embodiments of the present invention, a video source transceiver (200) may include a baseband integrated chip (BBIC) (230) and a radio-frequency integrated chip (RFIC) (240) to transmit and receive data signals along with functionally associated antenna(s) (250). According to further embodiments of the present invention, the RFIC (240) may include a down converter (242) for receiving and down converting uplink data signals and an up converter (244) for up converting and transmitting downlink data signals.

According to some embodiments of the present invention, the BBIC (230) may include a receive chain comprising an analog to digital converter (ADC) (232), an uplink demodulator (234) and a data interface (235). According to further embodiments of the present invention, the ADC (232) may receive analog signals from the down converter (242) and convert them into a corresponding digital form for the uplink demodulator (234). The uplink demodulator (234) may extract a data bearing signal from the received signal for the data interface (235) adapted to receive data bearing signals and to send them to a functionally associated sink signal to noise ratio control data input (228).

According to some embodiments of the present invention, the BBIC (230) may include a transmission chain comprising a data interface (236), a downlink modulator (237) and a digital to analog converter (DAC) (238). According to further embodiments of the present invention, the data interface (236) may receive video data from a functionally associated video data output (226) and send them to the downlink modulator (237) to generate a corresponding digital transmission signal. The DAC (238) may convert the transmission signal into a corresponding analog transmission signal for the up converter (244) to transmit the signal.

According to some embodiments of the present invention, the video source transceiver (200) may include a sink signal to noise ratio control data input (228), a video data input (220), a motion prediction module (224), a grid based predicted error value generator (223), an image processing logic (221), and a video data output (226). According to further embodiments of the present invention, the video data input (220) may receive video data including data corresponding to a base frame and/or data corresponding to a delta frame. For base frame data, the data may be sent to a functionally associated image processing logic (221) to process the data as a base frame for a functionally associated video data output (226). According to further embodiments of the present invention, data corresponding to a delta frame may be processed by a motion prediction module (224), a DCT transformer (222), and/or a grid based predicted error value generator (223) before the data is sent to a functionally associated image processing logic (221) to process the data as a delta frame for a functionally associated video data output (226). According to another embodiment, each frame may contain a mix of macro blocks that are sent in their entirety (i.e. in base frames), and macro blocks that are sent as prediction errors vs. a previous frame (i.e. in delta frames).

Figure 3:
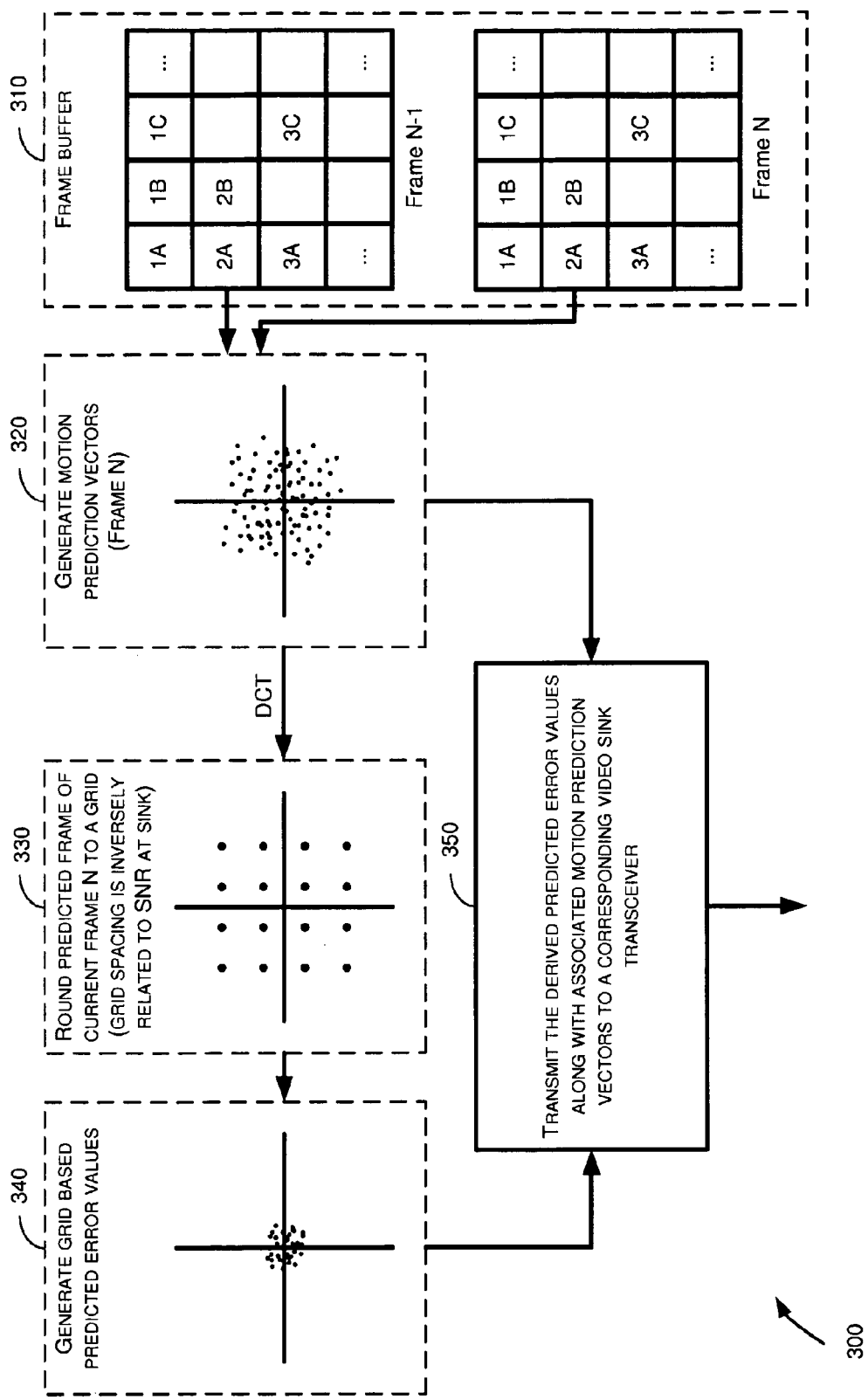
FIG. 3 is a schematic diagram including the steps of an exemplary method by which source transceiver image processing components may process data corresponding to a delta frame according to some embodiments of the present invention.

The operation of the motion prediction module (224) and/or a grid based predicted error value generator (223) may be described in view of FIG. 3 showing a schematic diagram including the steps of an exemplary method by which source transceiver image processing components may process data corresponding to a delta frame according to some embodiments of the present invention.

According to some embodiments of the present invention, a frame buffer (310) functionally associated with the video data input (220) may contain blocks of image data for each data frame in the buffer. For each current frame (e.g. frame N), a motion prediction vector may be generated (320) by the motion prediction module (224) based on a comparison of a block of current frame (N) with a corresponding block from a previous frame (N-1) as it is supposed to be estimated by receiver. For this purpose the transmitter may model the receiver demodulation process. Motion prediction vectors may be generated (320) for all blocks of the current frame or for any number of blocks and/or block subsets comprising the current frame. The motion vectors may then be used by motion prediction module (224) to predict frame N from N-1 as the receiver is expected to predict. According to further embodiments of the present invention, the new and predicted frames may be DCT transformed, and the grid based predicted error value generator (223) may round (330) the blocks of a predicted version of the current frame to a grid. The grid spacing of the rounding grid may be inversely related to a value received from the sink signal to noise ratio control data input (228), optionally via the image processing logic (221), where the value received corresponds to a signal to noise ratio measured at a functionally associated video sink transceiver. According to further embodiments of the present invention, grid based predicted error values may be generated (340) to represent the amount by which the receiver needs to correct quantized predicted frame N in order to generate a final version of frame N. According to some embodiments of the present invention, the derived predicted error values along with associated motion prediction vectors are sent (350) to the image processing logic (221) to process the data as a delta frame for a functionally associated video data output (226).

Figure 4:
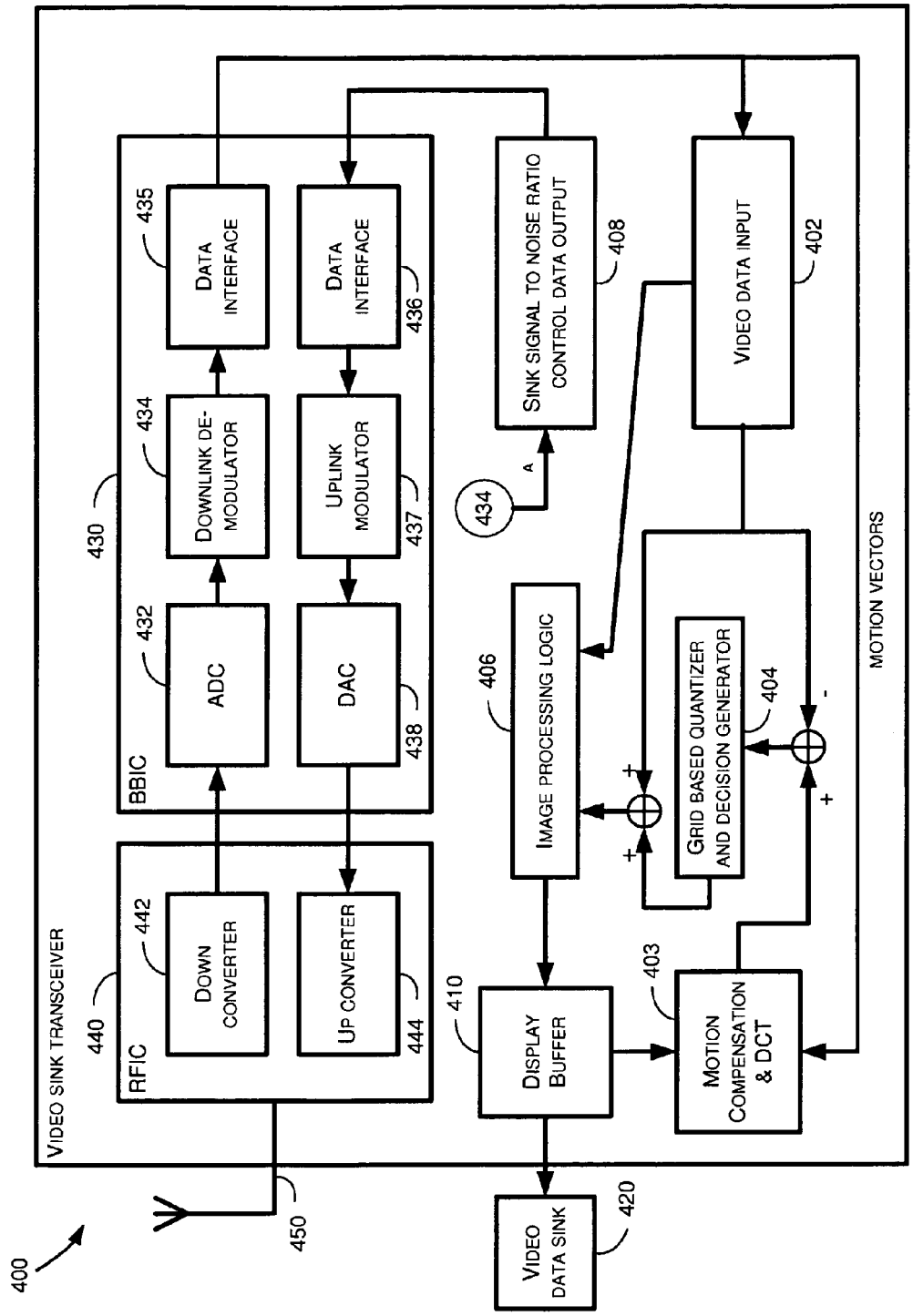
FIG. 4 is a functional block diagram of an exemplary video sink transceiver according to some embodiments of the present invention where the sink transceiver includes image processing components.

Now turning to FIG. 4, there is shown a functional block diagram of an exemplary video sink transceiver according to some embodiments of the present invention where the sink transceiver includes image processing components.

According to some embodiments of the present invention, a video sink transceiver (400) may include a baseband integrated chip (BBIC) (430) and a radio-frequency integrated chip (RFIC) (440) to transmit and receive data signals along with functionally associated antenna(s) (450). According to further embodiments of the present invention, the RFIC (440) may include a down converter (442) for receiving and down converting downlink data signals and an up converter (444) for up converting and transmitting uplink data signals.

According to some embodiments of the present invention, the BBIC (430) may include a receive chain comprising an analog to digital converter (ADC) (432), a downlink demodulator (434) and a data interface (435). According to further embodiments of the present invention, the ADC (432) may receive analog signals from the down converter (442) and convert them into a corresponding digital form for the downlink demodulator (434). The downlink demodulator (434) may extract a data bearing signal from the received signal for the data interface (435) adapted to receive data bearing signals and to send them to a functionally associated video data input (402).

According to some embodiments of the present invention, the BBIC (430) may include a transmission chain comprising a data interface (436), an uplink modulator (437) and a digital to analog converter (DAC) (438). According to further embodiments of the present invention, the data interface (436) may receive control data from a sink signal to noise ratio control data output (408) and send the control data to the uplink modulator (437) to generate a corresponding digital transmission signal. The DAC (438) may convert the digital transmission signal into a corresponding analog transmission signal for the up converter (444) to transmit the signal to a functionally associated video source transceiver.

According to some embodiments of the present invention, the video sink transceiver (400) may include a video data input (402), a motion compensation module (403), a grid based quantizer and decision generator (404), image processing logic (406), a display buffer (410) and a sink signal to noise ratio control data output (408). According to further embodiments of the present invention, the video sink transceiver (400) may be functionally associated with a video data sink (420) adapted to display video frames sent to the display buffer (410). According to further embodiments of the present invention, the video data input (402) may receive video data including data corresponding to a base frame and/or data corresponding to a delta frame. For base frame data, the data may be sent to a functionally associated image processing logic (406) to process the data as a base frame for a functionally associated display buffer (410). According to further embodiments of the present invention, data corresponding to a delta frame is subtracted from a prediction based on a previous frame (generated by motion compensation module 403). The resulting difference may be quantized to a grid by the grid based quantizer and decision generator (404). The quantized difference may be added to delta frame and sent to a functionally associated image processing logic (406) to process the data as a delta frame for a functionally associated display buffer (410).

Figure 5:
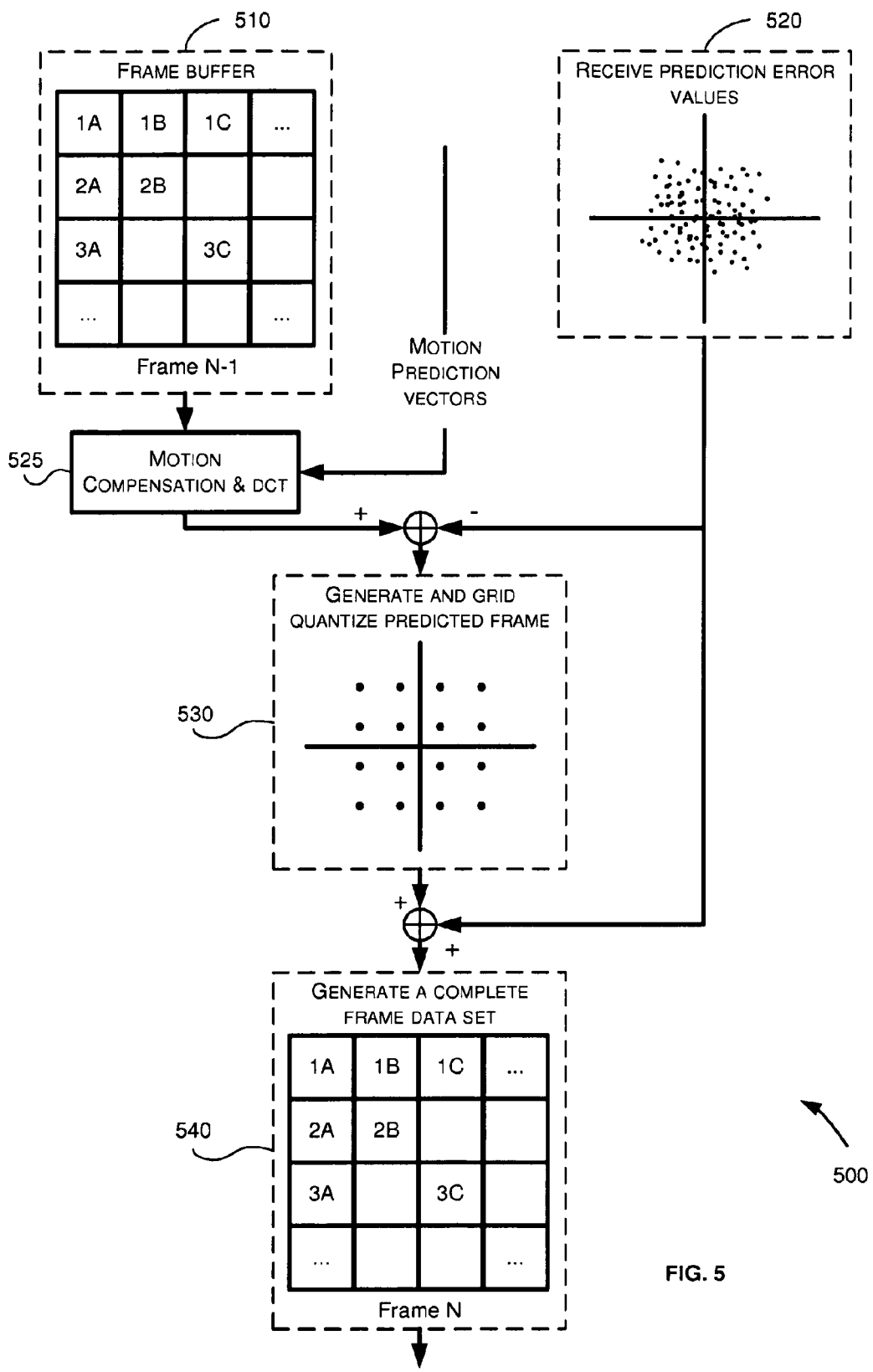
FIG. 5 is a schematic diagram including the steps of an exemplary method by which sink transceiver image processing components may process data corresponding to a delta frame according to some embodiments of the present invention.

The operation of the grid based quantizer and decision generator (404) may be described in view of FIG. 5 showing a schematic diagram including the steps of an exemplary method by which sink transceiver image processing components may process data corresponding to a delta frame according to some embodiments of the present invention.

According to some embodiments of the present invention, a frame buffer (510) functionally associated or otherwise integral to the display buffer (410) may contain blocks of image data for a previous substantially complete data frame (e.g. frame N−1). According to further embodiments of the present invention, motion prediction vectors from a corresponding video source transceiver may be applied to frame N−1 to predict frame N. The received predicted error (520) may be subtracted from the predicted frame N. According to further embodiments of the present invention, the grid based quantizer and decision generator (404) may grid quantize (530) the resulting difference to a grid with grid spacing inversely related to the sink transceiver signal to noise ratio. The resulting quantized difference is a grid quantized prediction of frame N. The grid spacing value used may be received from a corresponding source transceiver.

According to some embodiments of the present invention, the video data input may receive (520) predicted error values from a corresponding video source transceiver. According to further embodiments of the present invention, the grid based quantizer and decision generator (404) may generate (540) a complete frame data set for a substantially complete current frame (N) by adjusting the grid quantized predicted frame by the received predicted error values. According to further embodiments of the present invention, the substantially complete current frame may be sent to a functionally associated display buffer (410) for forwarding to a functionally associated video data sink (420).

According to some embodiments of the invention, the source transceiver augments the transmitted prediction error with redundancy (e.g. using low density parity check code—LDPC) computed based on the grid quantized data. At the sink transceiver the grid based quantizer and decision generator (404) may use this redundancy by incorporating a decoder (e.g. LDPC decoder) used to decode the grid quantized data. This additional redundancy may reduce the probably of the sink grid quantizer making a decision error According to some embodiments of the invention the source transceiver augments transmitted prediction error with a cyclic redundancy check (CRC) computed based on the grid quantized data. The sink receiver uses the CRC to validate that received grid quantizer decisions were correct. In the event that errors are identified in the grid quantizer decision decoding process, the sink transceiver may use concealment, request a retransmission and/or request a reference frame change (the latter is explained below).

According to some embodiments of the invention, the source transceiver may need to store several frames in memory (e.g. frame N−3, N−2 and N−1) in order to respond to sink transceiver decision decoding errors. When a sink transceiver identifies decision errors it may transmit information to the source transceiver about the most recent frame index (e.g. N−1) that was received and decoded correctly. The source transmitter may then use that frame as the reference frame instead of a new frame N+1. According to some embodiments of the present invention, the scheme suggested may assist in avoiding error propagation without any increase in transmission latency, whereas a scheme including a retransmission of frame N and only subsequently frame N+1 may increase latency.

According to some embodiments of the invention when a sink transceiver identifies decision errors, it may ask a source transceiver to reduce the digital data rate in order to increase digital data robustness. This reduction may occur both at source coding (compression) and at channel coding (e.g. lower modulation order). According to some embodiments of the present invention, the rate by which CRC and LDPC redundancy are encoded may be reduced. According to some embodiments of the present invention when the sink transceiver identifies decision errors it may ask the source transceiver to increase robustness of fine data e.g. by increasing grid quantization step size.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method of communicating video information from a video source transmitter to a video sink receiver using analog source coding, said method comprising:
at the source:
performing DCT (discrete cosine transform) on a predicted frame, thereby to produce predicted DCT values;
performing DCT on a new frame, thereby to produce new DCT values;
quantizing said predicted DCT values to a quantization grid, thereby producing quantized predicted DCT values; and
deriving prediction error values from the difference between said quantized predicted DCT values and said new DCT values.

2. The method according to claim 1, further comprising adding redundancy to the quantized predicted DCT data at the source and using the redundancy to decode the quantized predicted DCT data at the sink.

3. The method according to claim 1, further comprising adding a cyclic redundancy check (CRC) to the quantized predicted DCT data at the source and using the CRC at the sink to determine if the grid quantization at the sink was successful.

4. The method according to claim 3, further comprising at the sink applying concealment and/or informing the source to use a stored reference frame and/or informing the source to lower a digital data coding rate and/or informing the source to increase a step size of the grid when it is determined that grid quantization at the sink was unsuccessful.

5. The method according to claim 1, further comprising at the sync:
receiving the prediction error values; and
generating the grid decisions based on the received prediction error values and the predicted DCT values of a predicted frame.

6. The method according to claim 5, where the predicted frame is predicted from a previous frame.

7. The method according to claim 5, further comprising generating a complete frame data set at the sync by adding the received prediction error values onto the grid quantized decisions of the predicted DCT values of the predicted frame.

8. The method according to claim 1, wherein grid spacing of the grid is inversely related to a signal to noise ratio (SNR) detected at the sink.

9. A video source device comprising:
processing logic adapted to derive prediction error values for a transmitted analog encoded video by:
performing DCT (discrete cosine transform) on a predicted frame of said transmitted analog encoded video thereby to produce predicted DCT values;
performing DCT on a new frame, thereby to produce new DCT values;
quantizing said predicted DCT values to a quantization grid, thereby producing quantized predicted DCT values;
deriving prediction error values from the difference between said quantized predicted DCT values and said new DCT values; and
a transmitter adapted to transmit the derived prediction error values associated with said transmitted analog encoded video to a corresponding video sink transceiver.

10. The video source device according to claim 9, wherein said processing logic is further adapted to add redundancy to the quantized predicted DCT data.

11. The video source device according to claim 9, wherein said processing logic is further adapted to add a cyclic redundancy check (CRC) to the quantized predicted DCT data.

12. The video source device according to claim 9, wherein grid spacing of the grid is inversely related to a signal to noise ratio (SNR) detected at the sink.

13. A video sink device comprising:
a receiver adapted to receive noisy version of prediction error values from a functionally associated source capable of:
performing DCT (discrete cosine transform) on a predicted frame, thereby to produce predicted DCT values;
performing DCT on a new frame, thereby to produce new DCT values;
quantizing said predicted DCT values to a quantization grid, thereby producing quantized predicted DCT values; and deriving prediction error values from the difference between said quantized predicted DCT values and said new DCT values.

14. The video sink device according to claim 13, further adapted to receive redundancy values and use the redundancy values to decode the quantized predicted DCT data.

15. The video sink device according to claim 13, further adapted to receive a cyclic redundancy check (CRC) and use the CRC to determine if the grid quantization of the quantized predicted DCT data was successful.

16. The video sink device according to claim 15, further adapted to apply concealment and/or inform the source to use a stored reference frame and/or inform the source to lower a digital data coding rate and/or inform the source to increase a step size of the grid when it is determined that grid quantization of the quantized predicted DCT data was unsuccessful.

17. The video sink device according to claim 13, further adapted to generate grid decisions based on the received prediction error values and the predicted DCT values of a predicted frame.

18. The video sink device according to claim 17, where the predicted frame is predicted from a previous frame.

19. The video sink device according to claim 17, further adapted to generate a complete frame data set by adding the received prediction error values onto the grid quantized decisions of the predicted DCT values of the predicted frame.

* * * * *